Figure 1:
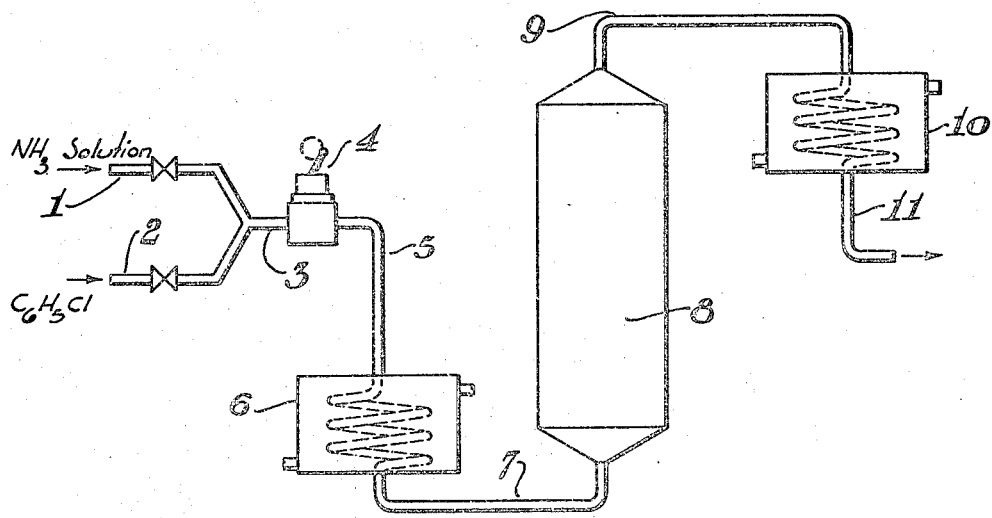

Patented Dec. 16, 1947

2,432,551

UNITED STATES PATENT OFFICE 2,432,551

PRODUCTION OF AROMATIC AMINES

William H. Williams, Ray D. Holmes, and Hubert F. V. Fruehauf, Midland, Mich., assignors to The Dow Chemical Company, Midland, Mich., a corporation of Delaware Application March 4, 1942, Serial No. 433,307

5 Claims. (Cl. 260—581)

This invention concerns an improved continuous process for the production of aromatic amines, particularly aniline, by the ammonolysis of corresponding halo-aromatic hydrocarbons.

A well known commercial method for manufacturing aniline comprises heating chlorobenzene together with an aqueous solution of ammonia and an ammonolysis catalyst to a reaction temperature between 150° and 350° C. in an autoclave with sufficient agitation to assure intimate mixing of the organic and aqueous phases. The autoclave is then cooled, discharged, and the products, e. g. aniline, diphenylamine, phenol, ammonium chloride, etc., are separated. This usual batch-wise mode of operation is disadvantageous, not only because of the many operations involved, certain of which are manual, and the loss of time and heat in initially heating the autoclave to the reaction temperature and subsequently cooling it so that it may be opened, but, more important, because certain of the operations, such as those of opening and discharging the autoclave, must be carried out with great care in order to avoid exposing the workmen to the aniline product, which is highly toxic in liquid or vapor form.

It has been taught in U. S. Patent 1,607,824 and its reissue, 17,280, that the above-described reaction for the formation of aniline may be carried out by passing the non-homogeneous reaction mixture through a tubular autoclave heated to the reaction temperature. Although this teaching is correct, serious difficulties are encountered when attempt is made to carry the reaction out continuously in such manner. The external heating of the autoclave promotes corrosive attack of the reaction mixture upon the walls of the autoclave and usually also causes a portion of the ammonolysis catalyst, e. g. a copper compound, to separate from the mixture and form a solid deposit in the autoclave which obstructs the flow. Also, when the mixture is passed through the autoclave at the high velocity usual in carrying reactions out in such tubular system, e. g. at a velocity sufficient to emulsify the non-homogeneous mixture, it rapidly attacks and corrodes the autoclave, even though the latter be constructed of a corrosion resistant alloy steel, such as a chrome-nickel alloy steel. Because of such difficulties the suggested use of a tubular autoclave for carrying the reaction out continuously has not met with success. Up to the time of the present invention the reaction has been carried out commercially by the batchwise method hereinbefore described.

We have now found that the mixture of a halo-aromatic hydrocarbon and an aqueous solution of ammonia and a catalyst need not be in emulsified form or even in a state of dispersion closely approximating an emulsion in order to obtain rapid reaction and that by passing such mixture under pressure and at a reaction temperature through a reactor at a rate far less than that required for emulsion, excessive corrosion of the reactor may be avoided. The linear rates of flow necessary to avoid excessive corrosion in accordance with the present invention vary depending upon the average density and the average viscosity of the reaction mixture and the shape and diameter of the channel through which the mixture is passed. However, the rates of flow may be expressed quite accurately in terms of the well known Reynolds' numbers (cf. pages 799 and 810–811 of the second edition of Perry's "Chemical Engineers' Handbook," published by McGraw-Hill Book Co., Inc. in 1941). The emulsified condition which is usually desired when reacting other non-homogeneous mixtures (e. g. a mixture of chlorobenzene and a caustic soda solution to form phenol) in a tubular autoclave is obtained at rates of flow corresponding to a Reynolds' number of 400,000 or higher. However, in preparing aromatic amines from halo-aromatic hydrocarbons and aqueous ammonia, we find that the corrosive action of the heated mixture on the metal reactor increases quite sharply and becomes excessive as the flow of the mixture through the metal reactor is increased from a rate corresponding to a Reynolds' number of about 150,000 to one corresponding to a Reynolds' number of about 250,000 or above. In practice of the present invention the rate of flow through the reactor is controlled so as not to exceed a Reynolds' number of 200,000, and is preferably such as to correspond to a Reynolds' number of less than 125,000. The flow may satisfactorily be very sluggish, e. g. only slightly greater than the rate at which the least dense phase of the mixture will rise through the other phase due to the difference in density.

We have also found that corrosion of the apparatus may be further curtailed by passing the freshly prepared mixture first quite rapidly through a heating zone wherein it is heated to a reaction temperature and then through the reactor without additional external heating. During passage through the heater, the mixture may of course be heated to any temperature within the range at which the ammonolysis reaction occurs satisfactorily, e. g. to any temperature between 170° and 350° C. when producing aniline from chlorobenzene and ammonia. However, we have observed that the tendency toward corrosion is increased by external heating and may become serious at points where the mixture is heated externally to temperatures greatly in excess of 200° C., e. g. to 250° C. or higher. We have further observed that the ammonolysis reaction is sufficiently exothermic so that the mixture need not be heated externally to such high temperature in order to obtain the preferred reaction temperature, e. g. of 220°–250° C. when producing aniline. Accordingly, during flow through the heater, the mixture is preferably heated to a temperature not greatly higher than that required to start the reaction. It preferably flows from the heater before as much as 10 per cent of the chlorobenzene is reacted. Heat liberated by the reaction causes a further temperature rise during flow of the mixture through the reactor without need for heating the latter externally. In some instances the heat generated by the reaction is sufficient so that external cooling of the reactor, i. e. so as to maintain the mixture at the preferred reaction temperature, is desirable. By so operating, the reaction mixture, which initially is non-corrosive or nearly so, is rapidly heated to the reaction temperature before being fed into the reactor and before the ammonolysis reaction has progressed sufficiently to render the mixture appreciably corrosive. The walls of the reactor are at a temperature somewhat lower than the mean temperature of the reacting mixture and much of the corrosion which would occur if the reactor were to be heated externally is avoided.

The invention then consists essentially in passing the reaction mixture through a zone wherein it is heated to a temperature sufficient to start the ammonolysis reaction, the rate of flow through the zone of external heating preferably being such that the mixture is retained within said zone for only a brief period, e. g. usually less than 5 minutes, after being brought to the reaction temperature, and then passing the mixture at a relatively slow linear rate of flow and preferably without further external heating through a zone wherein the ammonolysis reaction is continued to the desired state of completion. The vessel within which the reaction takes place for the most part may be of any desired shape, e. g. cubical, tubular, or spherical, etc. Usually an ordinary pressure-resistant tank constructed of iron or steel and having a diameter corresponding to 0.2 or more of its height or length is employed.

The accompanying drawing illustrates diagrammatically certain of the various forms of apparatus which may be employed in practicing the invention. In Fig. 1 of the drawing, the numerals 1 and 2 designate valved inlets which each connect with a line 3. The latter leads to a pump 4. A line 5 connects pump 4 with a heater 6, which may be provided as indicated with an inlet and outlet for passage of a heating fluid therethrough or may be of other usual types, such as a direct-fired heater or an electric heater, etc. A line 7 leads from heater 6 and connects with the lower end of a reactor 8. The reactor is preferably in the form of a vertical tank having conical ends as indicated, but it may be of other forms, such as those mentioned above. It may be constructed of usual structural metals, e. g. iron, steel, alloy steels, etc. At its top the reactor 8 is provided with a line 9 leading to a cooling device 10, which may be provided with an inlet and outlet for passage of a cooling fluid therethrough, as indicated, or may be constructed so as to cool the reacted mixture in other usual ways. The cooling device 10 is provided with an outlet line 11 which connects with usual devices, not shown, e. g. a relief valve, a separator, stills, etc., for reducing the pressure on the reaction mixture and separating the products. If desired, line 9 may be provided with a relief valve for reducing the pressure on the reaction mixture prior to cooling the latter.

Figure 2:
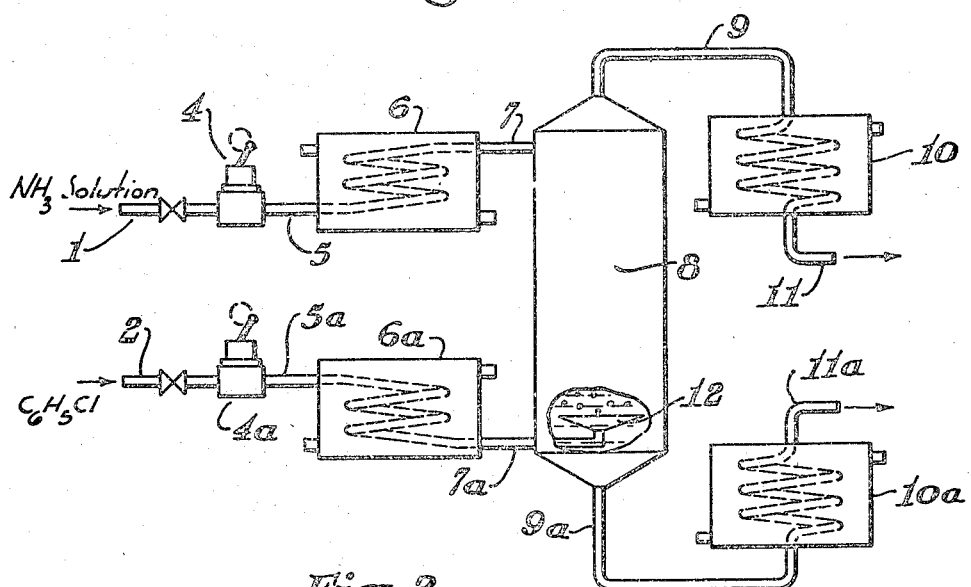

The reaction system shown in Fig. 2 of the drawing differs principally from that of Fig. 1 in providing for heating of the individual reactants to the reaction temperature before admixing them to form the reaction mixture; and in providing for counter-current flow of the two phases of the reaction mixture through the reactor and for separate withdrawal of the two phases of the reacted mixture from opposite ends of the reactor. In Fig. 2, the numerals 1 and 2 designate valved inlets leading to the respective pumps 4 and 4a. Lines 5 and 5a connect the pumps 4 and 4a with heaters 6 and 6a, respectively. A line 7 leads from heater 6 and connects with the upper end of the reactor 8. A line 7a leads from the heater 6a to a point near the lower end of the reactor 8 and terminates in a distributor head 12 situated inside of the reactor. The reactor 8 may be of the forms discussed with reference to Fig. 1. A line 9 leads from reactor 8 at a point near the upper end of the latter and connects with a usual cooling device 10, which is provided with an outlet 11. Similarly a line 9a leads from reactor 8 at a point near the lower end of the reactor and connects with a cooling device 10a which is provided with an outlet 11a. Relief valves, not shown, for reducing the pressure on the reaction mixture may be provided either in the lines 9 and 9a or in the reaction system at points beyond the coolers 10 and 10a, e. g. in the outlet lines 11 and 11a. The lines 11 and 11a connect with usual means, not shown, e. g. stills, evaporators, etc., for separating the reaction products.

The apparatus illustrated in the drawing may be modified or other forms of apparatus may be used in practicing the invention. For instance, in Fig. 1, means, not shown, may be provided for injecting a solution of the copper compound or other reaction catalyst into the liquor in line 7 at a point beyond which the liquor flows through the heater 6 so as to avoid deposition of solid copper compounds inside of the heater. As hereinbefore pointed out, the tendency for a portion of the catalyst to separate from the mixture and form a troublesome solid deposit is greatest at the point or points at which heat is applied externally to the mixture. By modifying the apparatus of Fig. 1 as just suggested, the catalyst need not be added until the remainder of the mixture has been heated to the temperature required for the reaction. Again, in some instances the reactor 8 in either of the Figs. 1 and 2 may advantageously be provided with usual means for externally cooling the same, e. g. a spray of water or a surrounding jacket through which a cooling fluid may be passed, since the ammonolysis reactions are in most instances quite strongly exothermic and the normal loss of heat by radiation may sometimes not suffice to maintain the desired reaction temperature. By externally cooling the reactor, the walls of the latter may be maintained at a temperature appreciably lower than the mean temperature of the reacting mixture so as to retard the corrosive action of the mixture on the reactor. In Fig. 2 of the drawing the heater 6 may be omitted, in which case the heat required to cause the ammonolysis reaction is supplied by the remaining heater to only one phase of the reaction mixture prior to admixing it with the other phase. Other ways in which the apparatus of the drawing may be modified or changed will be apparent. For instance, in place of the reactor being in vertical position as illustrated in Fig. 1 it may if desired be horizontal.

In preparing aniline from chlorobenzene and ammonia with the apparatus shown in Fig. 1 of the drawing, an aqueous solution of ammonia and ammonolysis catalyst (usually a cuprous compound) is introduced through inlet 1 and chlorobenzene is introduced through inlet 2, both liquids passing through the common line 3 to the pump 4, which developes the pressure necessary to forward the mixture through the system under the pressure at which the reaction is carried out, i. e. a pressure equal to or exceeding the vapor pressure of the mixture. The proportions of the reactants and catalyst and the concentration of the aqueous ammonia may be varied widely and are the same as may be used in the well known batch process for carrying out the reaction. The ammonia is usually employed in the form of a concentrated aqueous solution and in amount corresponding to 3 moles or more of ammonia per mole of chlorobenzene.

The mixture passes through line 5 into the heater 6, wherein it is heated to a reaction temperature between 170° and 350° C., preferably between 180° and 220° C. The time of heating, i. e. the time required for an integral portion of the mixture to flow through the heater, is brief, e. g. usually less than 10 minutes. As hereinbefore indicated, the time of heating is sufficiently short so that the reaction does not progress far enough to render the mixture highly corrosive and little if any corrosion of the heater occurs.

The heated mixture, which is maintained at a pressure exceeding its vapor pressure, flows from the heater 6 through line 7 into the lower end of reactor 8 and upward through the latter. The rate of flow within the reactor is restricted to less than that corresponding to a Reynolds' number of 200,000 and preferably corresponds to a Reynolds' number of less than 125,000. The reactor is preferably not heated externally, since external heating of the metal, e. g. iron or steel, apparatus in the presence of the partially reacted mixture promotes corrosion. However, the temperature of the mixture usually rises, e. g. from about 200° C. to between 220° C. and 250° C., due to the heat of reaction.

The reaction mixture flows from the top of reactor 8 through line 9 to a cooling device 10, where it is cooled to below the reaction temperature, e. g. to below 180° C. and usually to below 100° C. The mixture flows from the reaction system through outlet 11, which leads to other apparatus (not shown) for separating the reaction products. Procedure for separating the products is well known and does not require explanation. In flowing from the reaction system, the mixture is of course passed through a relief valve or other device for reducing the pressure.

It may be mentioned that the two phases of the reaction mixture are usually, though not necessarily, of different densities and that the phase of lower density rises more rapidly than the other phase, during upward flow of the mixture through the reactor 8. The relative rates at which the two phases flow upward through the reactor may be varied by dissolving in either phase a non-reactive substance of different density. Thus the chlorobenzene may be diluted with benzene or xylene, etc., to change the density of the organic phase, or salts such as sodium chloride, sodium sulphate, or ammonium chloride, etc., may be added to increase the density of the aqueous phase. Accordingly, the time of reaction, i. e. the time required for an integral portion of the more rapidly moving phase to pass through the reaction zone, may be varied not only by changing the rate of flow of the mixture as a whole, but also by such changes in the relative densities of the two phases of the mixture.

In producing aniline with the apparatus shown in Fig. 2 of the drawing, an aqueous solution of ammonia and the catalyst, e. g. cuprous ammino chloride, is introduced through inlet 1 to pump 4. The solution is pumped under pressure through line 5 to the heater 6, wherein it is heated, usually to a temperature between 180° and 220° C. The heated solution is passed through line 7 into the upper portion of the reactor 8, filling and flowing downward through the latter. While continuing such flow of the aqueous solution, chlorobenzene is introduced through inlet 2 to the pump 4a and is pumped under pressure through line 5a to the heater 6a, where it is heated, preferably to between 205° and 220° C. It is then passed through line 7a to the distributor 12, situated in the lower end of reactor 8. It leaves the distributor 12 in the form of droplets which flow counter to the down-flowing aqueous solution and react with the latter. In this connection it may be mentioned that at usual reaction temperatures, i. e. 200° C. and above, chlorobenzene is less dense than the aqueous phase of the mixture and that the ammonium chloride which is formed by the ammonolysis reaction tends to increase the density of the aqueous phase. Since the chlorobenzene and the aqueous ammonia solution are heated individually, i. e. before being admixed, and are substantially non-corrosive to structural metals, no precautions are required as to the time over which each is retained in the zone of external heating. The rates of flow of the chlorobenzene and the aqueous solution into the reactor 8 are restricted, of course, so as to permit accumulation of the organic phase of the mixture at the upper end of the reactor and accumulation of the aqueous phase toward the bottom of the reactor. The organic phase flows from reactor 8 through line 9 to a cooler 10 and leaves the reaction system through line 11, flowing of course through a relief valve (not shown) for releasing the pressure. Similarly, the aqueous phase flows from the lower end of reactor 8 through line 9a to a cooling device 10a and thence through the outlet line 11a. In flowing from the reaction system it also passes through a valve for releasing the pressure.

The outlet 11 of Fig. 1 and the outlets 11 and 11a of Fig. 2 are in practice connected directly with continuously operating devices, e. g. stills, etc., for separating the products so that the reactor is continuously discharged and the products are separated, all in a closed system and without exposing workmen to the toxic product.

The following examples describe certain ways in which the principle of the invention has been applied, but are not to be construed as limiting its scope.

*Example 1*

Aniline was prepared by pumping chlorobenzene at a rate of approximately 0.95 gallon per minute and an aqueous solution containing 26 per cent by weight of ammonia and dissolved copper compounds (principally dissolved cuprous chloride) in amount corresponding to 0.25 pound of the copper ions per gallon, at a rate of 2.1 gallons per minute into admixture with one another at about 2000 pounds per square inch pressure. The mixture was passed through a heating coil wherein it was heated to 223°–225° C. and then into the lower end of a vertical steel reactor of 120 gallons capacity. The contact time within the heater, i. e. the time required for an integral portion of the mixture to flow through the heater, was about 1 minute. The average upward rate of flow of the mixture within the reactor was approximately 2 feet per minute, which flow of this mixture corresponded to a Reynolds' number of about 26,000. However, the chlorobenzene, being less dense than the aqueous phase at the temperature employed, traveled upward in the form of drops more rapidly than the continuous aqueous phase and reacted with the latter during this travel. Due to the heat of reaction, the temperature of the mixture rose spontaneously to between 245° and 250° C. The mixture flowing from the top of the reactor was cooled and passed through a valve for releasing the pressure. As nearly as could be estimated the reaction time, i. e. the time required for an integral portion of the organic phase to pass through the reaction zone, was about 38 minutes. It was found that 51 per cent of the chlorobenzene initially employed had been consumed to form the usual products, e. g. aniline, diphenyl amine, ammonium chloride and a small amount of phenol. Very little, if any, corrosion of the reactor or the heating means occurred.

*Example 2*

The procedure of Example 1 was repeated, except that the reaction mixture was introduced at the top of the reactor and was caused to flow downward through the latter. By operating in this way the organic phase, e. g. chlorobenzene, etc., was caused to be the continuous phase in the reaction zone and the aqueous phase was discontinuous. The kinds and proportions of the reactants, the rate of flow into the reactor, and the reactor employed were the same as in Example 1. It was found that 41 per cent of the chlorobenzene was consumed to form the same products as in Example 1. Again, little, if any, corrosion occurred.

The method herein disclosed may of course be applied in carrying out other ammonolysis reactions for the production of aromatic amines, e. g. it may be applied in reacting ammonia with bromobenzene to produce aniline; in reacting ammonia with methyl-chlorobenzene to form toluidine; in reacting ammonia with ethyl-bromobenzene to form amino-ethylbenzene, etc. It may also be applied in producing secondary or tertiary aromatic amines by the reaction of primary or secondary aliphatic amines, e. g. methylamine, dimethylamine, ethylamine, diethylamine, propylamine or dipropylamine, etc., with halo-aromatic hydrocarbons such as chlorobenzene, bromobenzene, methyl-chlorobenzene, etc.

Other modes of applying the principle of the invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method wherein an aromatic amine is formed by heating a halo-aromatic hydrocarbon, selected from the class consisting of chloro-aromatic hydrocarbons and bromo-aromatic hydrocarbons, together with an ammonolysis catalyst and an aqueous solution of a compound selected from the class consisting of ammonia and primary and secondary aliphatic amines to a reaction temperature at a pressure at least as high as the vapor pressure of the mixture, the improvements which consist in carrying the reaction out by passing the reaction mixture in continuous flow through a heating zone, wherein it is heated to a temperature sufficient to initiate the ammonolysis reaction, and thence without further external heating through a reaction zone, in contact with metal surfaces composed for the most part of iron, at a rate corresponding to a Reynolds' number of less than 200,000.

2. In a method wherein an aromatic amine is formed by heating a halo-aromatic hydrocarbon, selected from the class consisting of chloro-aromatic hydrocarbons and bromo-aromatic hydrocarbons, together with an ammonolysis catalyst and an aqueous solution of a compound selected from the class consisting of ammonia and primary and secondary aliphatic amines to a reaction temperature at a pressure greater than the vapor pressure of the mixture, the improvements which consist in carrying the reaction out by passing the reaction mixture in continuous flow through a heating zone at such rate that the mixture is heated therein to a reaction temperature for a time such that not more than 10 per cent of the halo-aromatic hydrocarbon is reacted within said zone, and thence, without further external heating, through a reaction zone, in contact with metal surfaces composed for the most part of iron, at a rate corresponding to a Reynolds' number of less than 125,000.

3. A continuous method for the production of aniline which comprises passing chlorobenzene together with an aqueous solution of ammonia and an ammonolysis catalyst at a pressure greater than the vapor pressure of the mixture through a heating zone at such rate that the mixture is heated therein to a temperature above 170° C. for a time such that not more than 10 per cent of the chlorobenzene is reacted while in said zone, and thence, without further external heating, through a reaction zone, in contact with metal surfaces composed for the most part of iron, at a rate corresponding to a Reynolds' number of less than 125,000.

4. A continuous method for the production of aniline which comprises passing a mixture of chlorobenzene, an aqueous ammonia solution, and a dissolved cuprous compound at a pressure greater than the vapor pressure of the mixture through a heating zone at such rate that the mixture is heated therein to a reaction temperature between 180° and 220° C. for a time insufficient to permit 10 per cent of the chlorobenzene to react while in said zone, and thence, without further external heating, upward through a reaction zone, in contact with metal surfaces composed for the most part of iron, at a rate corresponding to a Reynolds' number of less than 125,000.

5. A continuous method for the production of aniline which comprises passing a mixture of chlorobenzene, an aqueous ammonia solution, and a dissolved cuprous compound at a pressure greater than the vapor pressure of the mixture through a heating zone at such rate that the mixture is heated therein to a reaction temperature above 180° C. for a time insufficient to permit 10 per cent of the chlorobenzene to react while in said zone, and thence, without further eternal heating, downward through a reaction zone, in contact with metal surfaces composed for the most part of iron, at a rate corresponding to a Reynolds' number of less than 125,000.

WILLIAM H. WILLIAMS.
RAY D. HOLMES.
HUBERT F. V. FRUEHAUF.

REFERENCES CITED

The following references are of record in the file of this patent:

UNITED STATES PATENTS

| Number | Name | Date |
| --- | --- | --- |
| 1,911,717 | Saunders | May 30, 1933 |
| 1,561,491 | Shannon | Nov. 17, 1925 |
| 1,833,485 | Griswold | Nov. 24, 1931 |
| 17,280 | Hale et al. | Apr. 23, 1929 |

OTHER REFERENCES

Groggins, Industrial & Engineering Chemistry, vol. 25, Mar. 1933, pp. 274–279.